(12) United States Patent
Noda

(10) Patent No.: US 10,538,242 B2
(45) Date of Patent: Jan. 21, 2020

(54) COLLISION MITIGATION DEVICE

(71) Applicant: DENSO CORPORATION, Kariya, Aichi-pref. (JP)

(72) Inventor: Kazuhiro Noda, Aichi-pref. (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 107 days.

(21) Appl. No.: 15/577,224

(22) PCT Filed: Apr. 15, 2016

(86) PCT No.: PCT/JP2016/062086
§ 371 (c)(1),
(2) Date: Nov. 27, 2017

(87) PCT Pub. No.: WO2016/194489
PCT Pub. Date: Dec. 8, 2016

(65) Prior Publication Data
US 2018/0148049 A1 May 31, 2018

(30) Foreign Application Priority Data
May 29, 2015 (JP) .................................. 2015-109944

(51) Int. Cl.
*B60W 30/00* (2006.01)
*B60W 30/09* (2012.01)
(Continued)

(52) U.S. Cl.
CPC .......... *B60W 30/09* (2013.01); *B60K 31/0066* (2013.01); *B60T 7/22* (2013.01);
(Continued)

(58) Field of Classification Search
USPC ....................................................... 701/36
See application file for complete search history.

(56) References Cited

U.S. PATENT DOCUMENTS

| 2006/0074540 A1* | 4/2006 | Braunberger ........... B60O 1/447 701/70 |
| 2009/0135065 A1* | 5/2009 | Tsuchida ................ G01S 13/931 342/454 |
| 2012/0212353 A1* | 8/2012 | Fung ....................... B60K 28/06 340/905 |

FOREIGN PATENT DOCUMENTS

| JP | 2003-015743 A | 1/2003 |
| JP | 2007-226680 | 9/2007 |

(Continued)

*Primary Examiner* — James M McPherson
(74) *Attorney, Agent, or Firm* — Knobbe, Martens, Olson & Bear, LLP

(57) ABSTRACT

When no diagnostic signal is detected, an activation determination operation unit 15B determines whether to activate a controlled object 16 based on the result of calculation (FSN information) by an FSN computation unit 14 and the vehicle state of the own vehicle input by a vehicle state input unit 13. An activation determination diagnosis unit 15C determines whether the activation determination operation unit 15B has properly performed an activation determination. When it is determined that the activation determination operation unit 15B has properly performed the activation determination, the control of the controlled object 16 based on the activation determination is permitted. When it is determined that the activation determination operation unit 15B has not properly performed the activation determination, the control of the controlled object 16 based on the activation determination is not permitted.

7 Claims, 6 Drawing Sheets

(51) Int. Cl.
*B60T 7/22* (2006.01)
*B60T 8/88* (2006.01)
*B60T 8/17* (2006.01)
*B60K 31/00* (2006.01)
*G08G 1/16* (2006.01)
*G07C 5/08* (2006.01)
*B60R 21/0134* (2006.01)

(52) U.S. Cl.
CPC ............... *B60T 8/17* (2013.01); *B60T 8/885* (2013.01); *G07C 5/0808* (2013.01); *G08G 1/16* (2013.01); *G08G 1/162* (2013.01); *G08G 1/166* (2013.01); *B60R 21/0134* (2013.01); *B60T 2201/024* (2013.01); *B60T 2270/413* (2013.01); *B60W 2420/42* (2013.01); *B60W 2420/52* (2013.01); *B60W 2520/10* (2013.01); *B60W 2520/14* (2013.01); *B60W 2550/146* (2013.01); *B60W 2550/306* (2013.01); *B60W 2550/308* (2013.01); *B60W 2710/18* (2013.01); *B60W 2710/20* (2013.01)

(56) References Cited

FOREIGN PATENT DOCUMENTS

| | | |
|---|---|---|
| JP | 4528457 B | 8/2010 |
| JP | 2014-181020 A | 9/2014 |

\* cited by examiner

COLLISION MITIGATION DEVICE

TECHNICAL FIELD

The present invention relates to a collision mitigation device installed in the own vehicle to mitigate a collision between the own vehicle and a preceding vehicle travelling ahead of the own vehicle by the activation of a controlled object.

BACKGROUND ART

PTL 1 describes a control device for an automobile braking device and its control method. More specifically, PTL 1 describes that: (1) the control device performs arithmetic operations at a first hierarchical level, a second hierarchical level, and a third hierarchical level; (2) the result of the operation at the second hierarchical level is sent to the first hierarchical level, and the second arithmetic operation is diagnosed at the first hierarchical level based on the incoming result of the operation at the second hierarchical level; (3) when it is determined that there is any abnormality in the second arithmetic operation, the result of the operation in the first hierarchical level is sent from the first hierarchical level to the third hierarchical level, and the operation is performed in the third hierarchical level based on the result of the operation in the first hierarchical level; and (4) the braking force of the vehicle is computed in the first hierarchical level, the frictional braking force in the braking force of the vehicle is computed in the second hierarchical level, and the braking force corresponding to each wheel is computed in the third hierarchical level.

CITATION LIST

Patent Literature

[PTL 1]
  JP 4528457 B

SUMMARY OF THE INVENTION

Technical Problem

According to the technique described in PTL 1, however, when the second arithmetic operation is not correctly diagnosed, a braking-related device such as a brake may be activated at an inappropriate timing. That is, the technique described in PTL 1 suffers from low reliability of determination as to whether to activate the device.

The present invention is devised in view of the foregoing problem. An object of the present invention is to improve the reliability of determination as to whether to activate a controlled object such as a brake.

Solution to Problem

In a collision mitigation device of the present invention, a radar recognition unit performs radar recognition of a preceding vehicle travelling ahead of an own vehicle based on the result of emitting radar waves from a radar sensor to the direction ahead of the own vehicle, and receiving, by the radar sensor, reflected waves that are the emitted radar waves reflected by a target, and an image recognition unit performs image recognition of the preceding vehicle travelling ahead of the own vehicle based on an image of the area ahead of the own vehicle captured by an image sensor. Then, a position calculation unit calculates the position of the preceding vehicle based on the result of radar recognition of the preceding vehicle by the radar recognition unit and the result of image recognition of the preceding vehicle by the image recognition unit. Further, a state detection unit detects a vehicle state of the own vehicle, and a signal detection unit detects an abnormality occurrence signal indicating the occurrence of an abnormality in the collision mitigation device. Then, when the signal detection unit detects no abnormality occurrence signal, an activation determination operation unit determines whether to activate the controlled object based on the result of the calculation obtained from the position calculation unit and the vehicle state of the own vehicle detected by the state detection unit.

Further, in the collision mitigation device of the present invention, an activation determination diagnosis unit determines whether the activation determination operation unit has properly performed the activation determination. When the activation determination diagnosis unit determines that the activation determination operation unit has properly performed the activation determination, a control processing unit permits the controlled object to be controlled based on the activation determination. When the activation determination diagnosis unit determines that the activation determination operation unit has not properly performed the activation determination of activation, the control processing unit does not permit the controlled object to be controlled based on the activation determination of activation.

Therefore, the collision mitigation device of the present invention improves the reliability of determination whether to activate the controlled object such as a brake, thereby improving reliability of the collision mitigation device as a system installed in the own vehicle to mitigate a collision between the own vehicle and a preceding vehicle travelling ahead of the own vehicle, based on the activation of the controlled object.

DESCRIPTION OF EMBODIMENT

Embodiments of the present invention will be described with reference to the drawings. The present invention is not limited to the following embodiments but can be implemented in various modes.

1. Configuration of Collision Mitigation Device 1

Figure 1:
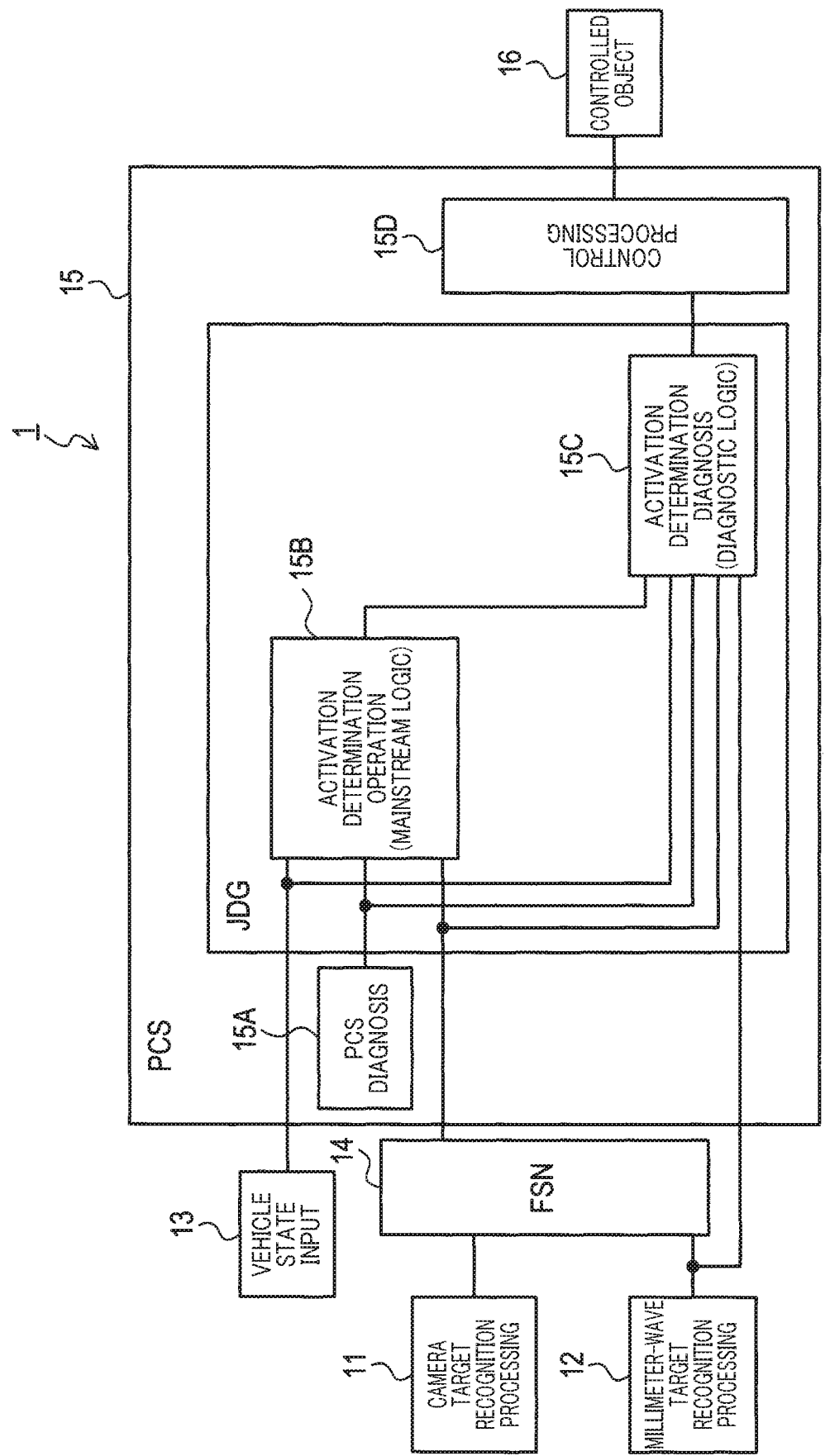
FIG. 1 is a schematic block diagram of a collision mitigation device 1.

A collision mitigation device 1 shown in FIG. 1 is installed in the own vehicle and has a function of mitigating a collision between the own vehicle and a preceding vehicle travelling ahead of the own vehicle by the activation of a controlled object.

Accordingly, the collision mitigation device 1 includes a camera target recognition processing unit 11, a millimeter-wave target recognition processing unit 12, a vehicle state input unit 13, an FSN computation unit 14, a pre-crash safety system (hereinafter, referred to as a PCS) 15, and a controlled object 16.

1.1. Configuration of Camera Target Recognition Processing Unit 11

The camera target recognition processing unit 11 recognizes an image of a preceding vehicle travelling ahead of the own vehicle based on an image of the area ahead of the own vehicle captured by an image sensor not shown. The image sensor includes, for example, a CCD camera disposed near the center of the front side of the own vehicle. The image sensor has a known configuration to perform known image processing, such as template matching, on the image data captured by the CCD camera to detect a predetermined target (vehicle, pedestrian, or the like) present in the imaging area. The image sensor then transmits information about the imaged target detected using the foregoing process as image target information to the camera target recognition processing unit 11. The image target information includes at least information about the type, size, and position (distance and azimuth) of the detected image target.

The camera target recognition processing unit 11 is an example of the image recognition unit of the present invention.

1.2. Configuration of Millimeter-Wave Target Recognition Processing Unit 12

The millimeter-wave target recognition processing unit 12 performs radar recognition of a preceding vehicle travelling ahead of the own vehicle based on the result of emitting radar waves from a radar sensor not shown, to the forward direction of the own vehicle and receiving, by the radar sensor, reflected waves that are the emitted radar waves reflected by a target. The radar sensor is formed as a known millimeter-wave radar or the like, for example, that irradiates a target present ahead of the own vehicle with directional electromagnetic waves and receives the reflected waves to detect the distance to the target, the lateral position (or azimuth) of the target, and the speed of the target relative to the own vehicle, and recognizes the type, shape, position, and the like of the target.

The millimeter-wave target recognition processing unit 12 is an example of the radar recognition unit of the present invention.

1.3. Configuration of Vehicle State Input Unit 13

The vehicle state input unit 13 inputs the travelling speed of the own vehicle detected by a vehicle speed sensor not shown and the curvature radius (estimated R) of travel curve of the own vehicle detected by a yaw rate sensor not shown, as a vehicle state of the own vehicle. The vehicle speed sensor is configured in a known manner to detect the speed of the own vehicle based on the rotation speed of the wheels of the own vehicle. The yaw rate sensor is configured in a known manner to detect the cornering angular speed of the own vehicle.

The vehicle state input unit 13 is an example of the state detection unit of the present invention.

1.4. Configuration of FSN Computation Unit 14

The FSN computation unit 14 calculates the position of the preceding vehicle based on the result of image recognition of the preceding vehicle performed by the camera target recognition processing unit 11 and the result of radar recognition of the preceding vehicle performed by the millimeter-wave target recognition processing unit 12. Specifically, the FSN computation unit 14 combines the detection results of both units to compensate different kinds of detection errors of the radar sensor and the image sensor with each other, thereby computing combined fusion (FSN) information indicating the position of the preceding vehicle.

More specifically, when the positions of the preceding vehicle detected by the radar sensor and the image sensor fall within respective predetermined acceptable error ranges, for example, the FSN computation unit 14 recognizes both of the detection results as data related to the same preceding vehicle. Using the recognized data, the FSN computation unit 14 computes the lateral position and vertical position of the preceding vehicle based on the relative distance detected by the radar sensor and the direction of the preceding vehicle based on the lateral position and vertical position detected by the image sensor.

The FSN information thus generated is output to the PCS 15, as information about the detected position of the target with higher accuracy than information about the result of the detection performed by the radar sensor alone or the image sensor alone. Separately, the position detection information as the detection results of the radar sensor alone and the image sensor alone is also output to the PCS 15. The FSN information and the position detection information are ensured to be output at their respective predetermined cycles.

The FSN computation unit 14 is an example of the position calculation unit of the present invention.

1.5. Configuration of PCS 15

The PCS 15 is formed as a known computer including a CPU, a ROM, a RAM, and the like. The PCS 15 executes programs stored in the ROM to perform various processes such as a collision mitigation process and a determination diagnostic process described later. Further, the PCS 15 performs these processes and activates the controlled object 16 according to the results of these processes.

As a functional configuration, the PCS 15 includes a PCS diagnostic detection unit 15A, an activation determination operation unit 15B, an activation determination diagnosis unit 15C, and a control processing unit 15D. Among them, the activation determination operation unit 15B and the activation determination diagnosis unit 15C constitute an activation determination circuit (JDG).

When an abnormality occurs in the PCS 15, the PCS diagnostic detection unit 15A detects a diagnostic signal (abnormality occurrence signal) output from the PCS 15.

The activation determination operation unit 15B determines whether to activate the controlled object 16. Specifically, when the PCS diagnostic detection unit 15A detects no diagnostic signal, the activation determination operation unit 15B determines whether to activate the controlled object 16 based on the result of operation obtained from the FSN computation unit 14 (FSN information) and the vehicle state of the own vehicle input by the vehicle state input unit 13. Accordingly, the activation determination operation unit 15B executes an activation determination operation (mainstream logic) described later.

The activation determination diagnosis unit 15C determines whether the activation determination operation unit 15B has properly performed the activation determination.

Accordingly, the activation determination diagnosis unit 15C executes an activation determination diagnosis (diagnostic logic) described later.

The control processing unit 15D controls the controlled object 16 based on the activation determination made by the activation determination operation unit 15B, according to the result of the diagnosis performed by the activation determination diagnosis unit 15C. Specifically, when the activation determination diagnosis unit 15C determines that the activation determination operation unit 15B has properly performed the activation determination, the control processing unit 15D permits controlling of the controlled object 16 based on the activation determination made by the activation determination operation unit 15B. When the activation determination diagnosis unit 15C determines that the activation determination operation unit 15B has not properly performed the activation determination, the control processing unit 15D does not permit the controlled object 16 to be controlled based on the activation determination made by the activation determination operation unit 15B.

The PCS 15 is an example of the signal detection unit, the activation determination operation unit, the activation determination diagnosis unit, and the control processing unit of the present invention.

1.6. Configuration of Controlled Object 16

The controlled object 16 is configured to mitigate a collision between the own vehicle and a preceding vehicle travelling ahead of the own vehicle by the activation of the controlled object 16. The controlled object 16 may be, for example, a brake, a steering system, an actuator for driving a seat belt or the like, or an alarm device for issuing an alarm. In the embodiment described below, the controlled object 16 is a brake.

2. Description of a Collision Mitigation Process

Figure 2:
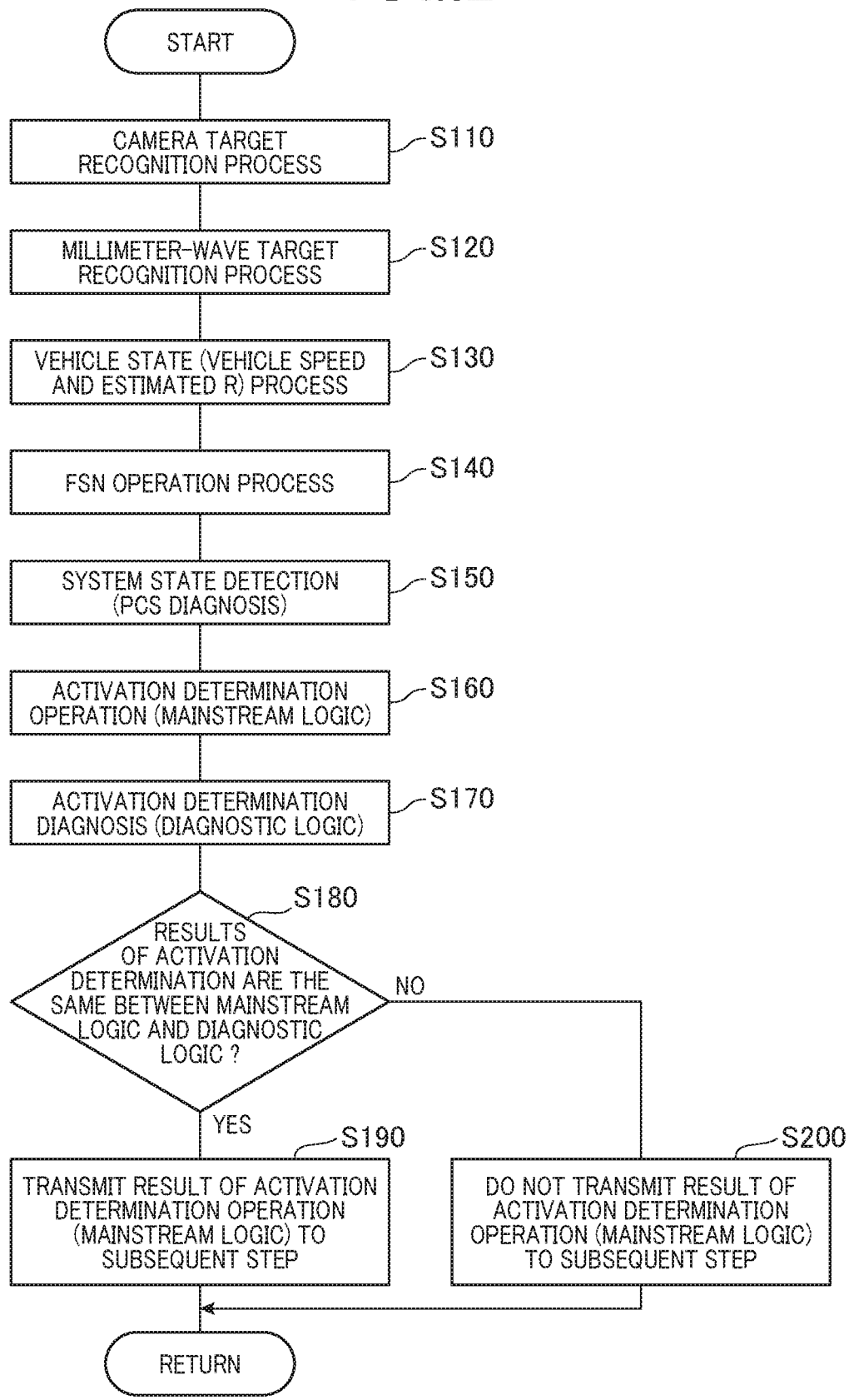
FIG. 2 is a flow diagram of a collision mitigation process.

Next, a collision mitigation process executed by the collision mitigation device 1 will be described with reference to the flow diagram of FIG. 2.

This process is executed when the collision mitigation device 1 is powered on.

At the first step S110, a camera target recognition process is performed. Specifically, the camera target recognition processing unit 11 performs image recognition of a preceding vehicle travelling ahead of the own vehicle based on an image of the area ahead of the own vehicle captured by the image sensor not shown. Then, the process proceeds to step S120.

At S120, a millimeter-wave target recognition process is performed. Specifically, the millimeter-wave target recognition processing unit 12 performs radar recognition of the preceding vehicle travelling ahead of the own vehicle based on the result of emitting radar waves from a radar sensor not shown to the forward direction of the own vehicle and receiving, by the radar sensor, reflected waves that are the irradiated radar waves reflected by a target. Then, the process proceeds to step S130.

At S130, a vehicle state process is performed. Specifically, the vehicle state input unit 13 inputs the travelling speed of the own vehicle detected by a vehicle speed sensor not shown and the curvature radius (estimated R) of progress curve of the own vehicle detected by a yaw rate sensor not shown, as a vehicle state of the own vehicle. Then, the process proceeds to step S140.

At step S140, an FSN operation process is performed. Specifically, the FSN computation unit 14 calculates the position of the preceding vehicle based on the result of image recognition of the preceding vehicle performed by the camera target recognition processing unit 11 and the result of radar recognition of the preceding vehicle performed by the millimeter-wave target recognition processing unit 12. Then, the process proceeds to step S150.

At step S150, the state of the system is detected. Specifically, when an abnormality occurs in the PCS 15, the PCS diagnostic detection unit 15A detects a diagnostic signal output from the PCS 15. Then, the process proceeds to step S160.

At step S160, an activation determination operation (mainstream logic) is performed. That is, when the PCS diagnostic detection unit 15A detects no diagnostic signal, the activation determination operation unit 15B determines whether to activate the controlled object 16 based on the result of the calculation obtained from the FSN computation unit 14 (FSN information) and the vehicle state of the own vehicle input by the vehicle state input unit 13. The activation determination operation (mainstream logic) will be described later in detail. In this case, as the result of the determination for activating the controlled object 16, the activation determination operation unit 15B outputs a value of 1 (activation instruction), and as the result of the determination for not activating the controlled object 16, the activation determination operation unit 15B outputs a value of 0. Then, the process proceeds to step S170.

At step S170, an activation determination diagnosis (diagnostic logic) is performed. Specifically, the activation determination diagnosis unit 15C determines whether the activation determination operation unit 15B has properly performed the activation determination. The activation determination diagnosis (diagnostic logic) will be described later in detail. In this case, as the result of the activation determination that the activation determination operation unit 15B has properly performed the activation determination, the activation determination diagnosis unit 15C outputs a value of 1, and as the result of the activation determination that the activation determination operation unit 15B has not properly performed the activation determination, the activation determination diagnosis unit 15C outputs a value of 0. Then, the process proceeds to step S180.

At step S180, it is determined whether the result of the activation determination operation (mainstream logic) marches the result of the activation determination diagnosis (diagnostic logic). Specifically, the control processing unit 15D compares the results of the activation determination between the activation determination operation (mainstream logic) at step S160 and the activation determination diagnosis (diagnostic logic) at step S170. When there is a match between the two results, with the value being 1 or 0 the control processing unit 15D makes an affirmative determination. When there is no match between the two results, with the value of one being 1 and that of the other being 0 the control processing unit 15D makes a negative determination. When the control processing unit 15D makes the affirmative determination (YES at S180), the process proceeds to S190. When the control processing unit 15D makes the negative determination (NO at S180), the process proceeds to step S200.

At step S190, the result of the activation determination operation (mainstream logic) is transmitted to the subsequent step. Specifically, when it is determined at step S180 that the results of the activation determination are the same between the activation determination operation (mainstream logic) and the activation determination diagnosis (diagnostic logic), the controlled object 16 is permitted to be controlled based on the result of the activation determination of the activation determination operation (mainstream logic) at step S160, and accordingly the result of the activation determination of the activation determination operation (mainstream logic) at step S160 is sent to the control processing unit 15D for the control processing of the controlled object 16, as the subsequent step. Consequently, when the result of the activation determination of the activation determination operation (mainstream logic) at step S160 is a value of 1 the controlled object 16 is activated. When the result of the activation determination in the activation determination operation (mainstream logic) at step S160 is a value of 0 the controlled object 16 is not activated. Then, the process returns to the start.

At step S200, the result of the activation determination operation (mainstream logic) is not transmitted to the subsequent step. Specifically, when it is determined at step S180 that the results of the activation determination are not the same between the activation determination operation (mainstream logic) and the activation determination diagnosis (diagnostic logic), the controlled object 16 is not permitted to be controlled based on the result of the activation determination in the activation determination operation (mainstream logic) at step S160, and accordingly the result of the activation determination of the activation determination operation (mainstream logic) at step S160 is not sent to the control processing unit 15D for the control processing of the controlled object 16, as the subsequent step. Consequently, even when the result of the activation determination of the activation determination operation (mainstream logic) at step S160 is the value of 1 the controlled object 16 is not activated because the result of the activation determination of the activation determination diagnosis (diagnostic logic) at step S170 is the value of 0. Also, when the result of the activation determination in the activation determination operation (mainstream logic) at step S160 is the value of 0 the controlled object 16 is not activated. Then, the process returns to the start.

2.1. Description of the Activation Determination Operation (Mainstream Logic)

Figure 3:
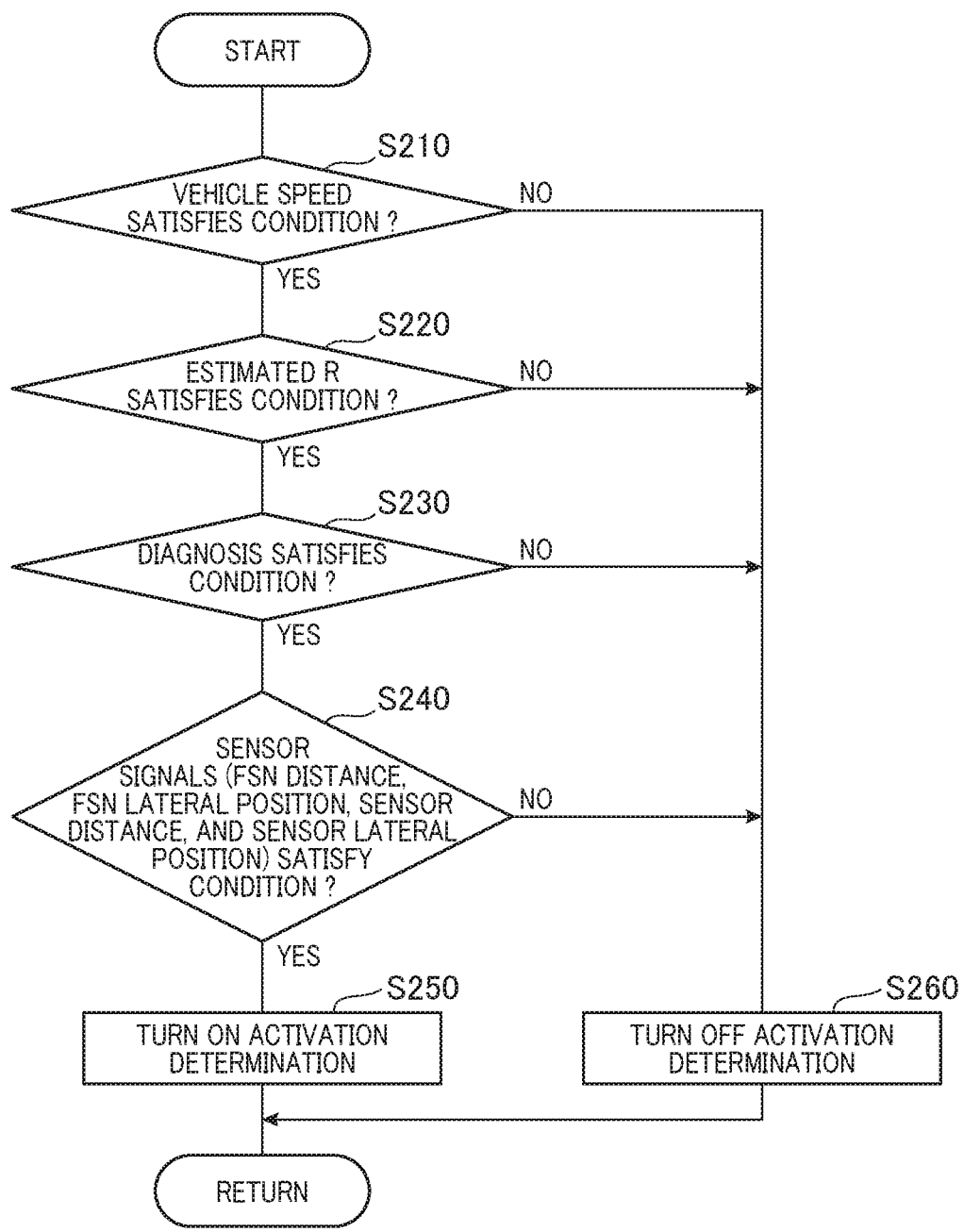
FIG. 3 is a flow diagram of an activation determination operation (mainstream logic)

Next, with reference to the flow diagram of FIG. 3, the activation determination operation (mainstream logic) executed by the collision mitigation device 1 will be described.

This process is executed as a sub routine of step S160 when the collision mitigation the process proceeds to step S160.

At the first step S210, it is determined whether the vehicle speed satisfies a predetermined condition. Specifically, the activation determination operation unit 15B determines whether the travelling speed of the own vehicle input by the vehicle state input unit 13 satisfies a predetermined condition. The predetermined condition is set in advance through experiments or the like. When the activation determination operation unit 15B makes an affirmative determination (YES at S210), the process proceeds to step S220. When the activation determination operation unit 15B makes a negative determination (NO at S210), the process proceeds to step S260.

At step S220, it is determined whether the estimated R satisfies a predetermined condition. Specifically, the activation determination operation unit 15B determines whether the curvature radius (the estimated R) of progress curve of the own vehicle input by the vehicle state input unit 13 satisfies a predetermined condition. The predetermined condition is set in advance through experiments or the like. When the activation determination operation unit 15B makes an affirmative determination (YES at S220), the process proceeds to step S230. When the activation determination operation unit 15B makes a negative determination (NO at S220), the process proceeds to step S260.

At step S230, it is determined whether the diagnosis satisfies a predetermined condition. Specifically, when the PCS diagnostic detection unit 15A does not detect a diagnostic signal that would be output by the PCS 15 in the occurrence of an abnormality in the PCS 15, the activation determination operation unit 15B makes an affirmative determination, When the PCS diagnostic detection unit 15A detects the diagnostic signal, the activation determination operation unit 15B makes a negative determination. When the activation determination operation unit 15B makes an affirmative determination (YES at S230), the process proceeds to step S240. When the activation determination operation unit 15B makes a negative determination (NO at S230), the process proceeds to step S260.

At step S240, it is determined whether the sensor signals satisfy a predetermined condition. Specifically, when all the sensor signals satisfy a predetermined condition, the activation determination operation unit 15B makes an affirmative determination. When none of the sensor signals satisfies a predetermined condition, the activation determination operation unit 15B makes a negative determination. The sensor signals may indicate FSN distance, FSN lateral position, sensor distance, and sensor lateral position. The determination process on each sensor signal will be described later. When the activation determination operation unit 15B makes the affirmative determination (YES at S240), the process proceeds to step S250. When the activation determination operation unit 15B makes the negative determination (NO at S240), the process proceeds to step S260.

At step S250, the activation determination is set to be ON. Specifically, the activation determination operation unit 15B determines that the controlled object 16 needs to be activated, and therefore outputs a value of 1 as the result of the activation determination. Then, the process returns to the start.

At step S260, the activation determination is set to be OFF. Specifically, the activation determination operation unit 15B determines that the controlled object 16 needs not to be activated and determines that the activation determination operation unit 15B has not properly performed the activation determination, and therefore outputs a value of 0 as the result of the activation determination. Then, the process returns to the start.

2.2. Description of the Activation Determination Diagnosis (Diagnostic Logic)

Figure 4:
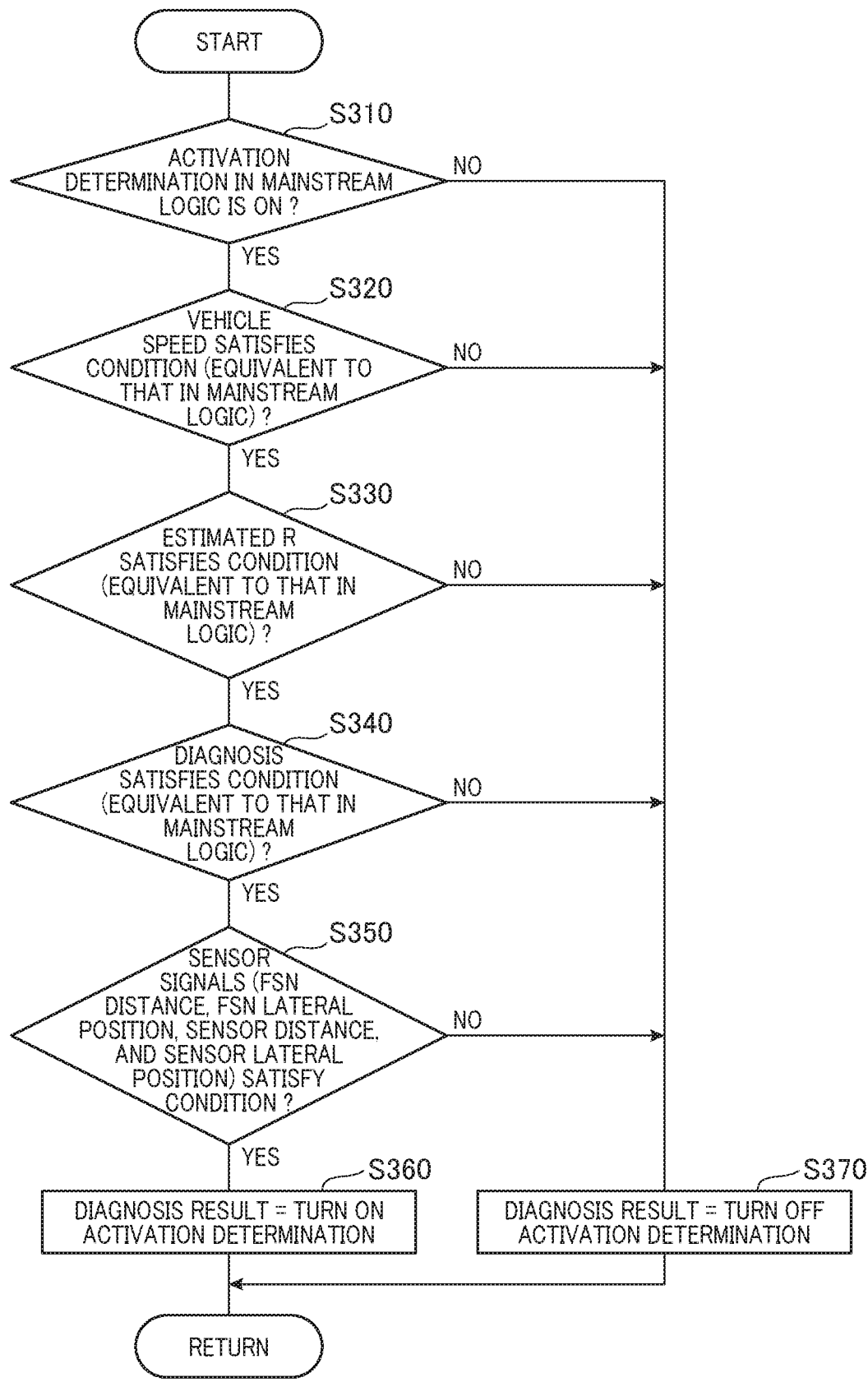
FIG. 4 is a flow diagram of an activation determination diagnosis (diagnostic logic)

Next, with reference to the flow diagram of FIG. 4, the activation determination diagnosis (diagnostic logic) executed by the collision mitigation device 1 will be described.

This process is executed as a sub routine of step S170 when the collision mitigation the process proceeds to step S170.

At the first step S310, it is determined whether the activation determination of the activation determination operation (mainstream logic) is on. Specifically, the activation determination diagnosis unit 15C determines whether the activation determination performed by the activation determination operation unit 15B of the PCS 15 is on. When the activation determination diagnosis unit 15C makes an affirmative determination (YES at S310), the process proceeds to step S320. When the activation determination diagnosis unit 15C makes a negative determination (NO at S310), the process proceeds to step S370.

At step S320, it is determined whether the vehicle speed satisfies a predetermined condition. Specifically, the activation determination diagnosis unit 15C determines whether the travelling speed of the own vehicle input by the vehicle state input unit 13 satisfies a predetermined condition. The predetermined condition is set in advance through experiments or the like but is preferably equivalent to the condition at step S210 of the activation determination operation (mainstream logic). When the activation determination diagnosis unit 15C makes an affirmative determination (YES at S320), the process proceeds to step S330. When the activation determination diagnosis unit 15C makes a negative determination (NO at S320), the process proceeds to step S370.

At step S330, it is determined whether the estimated R satisfies a predetermined condition. Specifically, the activation determination diagnosis unit 15C determines whether the curvature radius (the estimated R) of progress curve of the own vehicle input by the vehicle state input unit 13 satisfies a predetermined condition. The predetermined condition is set in advance through experiments or the like but is preferably equivalent to the condition at step S220 of the activation determination operation (mainstream logic). When the activation determination diagnosis unit 15C makes an affirmative determination (YES at S330), the process proceeds to step S340. When the activation determination diagnosis unit 15C makes a negative determination (NO at S330), the process proceeds to step S370.

At step S340, it is determined whether the diagnosis satisfies a predetermined condition. Specifically, when the PCS diagnostic detection unit 15A detects no diagnostic signal that would be output by the PCS 15 while an abnormality occurs in the PCS 15, the activation determination diagnosis unit 15C makes an affirmative determination. When the PCS diagnostic detection unit 15A detects the diagnostic signal, the activation determination diagnosis unit 15C makes a negative determination. The condition for the determination is preferably equivalent to the condition at step S230 of the activation determination operation (mainstream logic). When the activation determination diagnosis unit 15C makes an affirmative determination (YES at S340), the process proceeds to step S350. When the activation determination diagnosis unit 15C makes a negative determination (NO at S340), the process proceeds to step S370.

At step S350, it is determined whether the sensor signals satisfy a predetermined condition. Specifically, when all the sensor signals satisfy a predetermined condition, the activation determination diagnosis unit 15C makes an affirmative determination. When any one of the sensor signals does not satisfy a corresponding predetermined condition, the activation determination diagnosis unit 15C makes a negative determination. The sensor signals may indicate FSN distance, FSN lateral position, sensor distance, and sensor lateral position. The determination process for each sensor signal will be described later. When the activation determination diagnosis unit 15C makes the affirmative determination (YES at S350), the process proceeds to step S360. When the activation determination diagnosis unit 15C makes the negative determination because none of the sensor signals satisfies a predetermined condition (NO at S350), the process proceeds to step S370.

At step S360, the diagnostic result is set such that the activation determination is to be ON. Specifically, the activation determination diagnosis unit 15C determines that the foregoing determination criteria set from the viewpoint of mitigating a collision between the own vehicle and the preceding vehicle with the activation of the controlled object 16 are satisfied and the activation determination operation unit 15B has properly performed the activation determination. Therefore, the activation determination diagnosis unit 15C outputs a value of 1 as the result of the activation determination. Then, process returns to the start.

At step S370, the diagnostic result is set such that the activation determination is to be OFF. Specifically, the activation determination diagnosis unit 15C determines that the foregoing determination criteria set from the viewpoint of mitigating a collision between the own vehicle and the preceding vehicle with the activation of the controlled object 16 are not satisfied and the activation determination operation unit 15B has not properly performed the activation determination. Therefore, the activation determination diagnosis unit 15C outputs a value of 0 as the result of the activation determination. Then, process returns to the start.

2.3. Descriptions of the Determination Processes for the Sensor Signals

Next, with reference to FIGS. 5 and 6, the determination processes on the sensor signals will be described.

These processes are executed when the activation determination operation (mainstream logic) proceeds to step S240 or when the activation determination diagnosis (diagnostic logic) proceeds to step S350. The sensor signals may indicate FSN distance, FSN lateral position, sensor distance, and sensor lateral position. Each of the sensor signals is determined for reasonableness. The sensor signals will be described below in sequence.

(1) FSN Distance:

The FSN distance means the distance from the own vehicle to a preceding vehicle, which is calculated using both the result of radar recognition of the preceding vehicle obtained from the millimeter-wave target recognition processing unit 12 and the result of image recognition of the preceding vehicle obtained from the camera target recognition processing unit 11.

Figure 5:
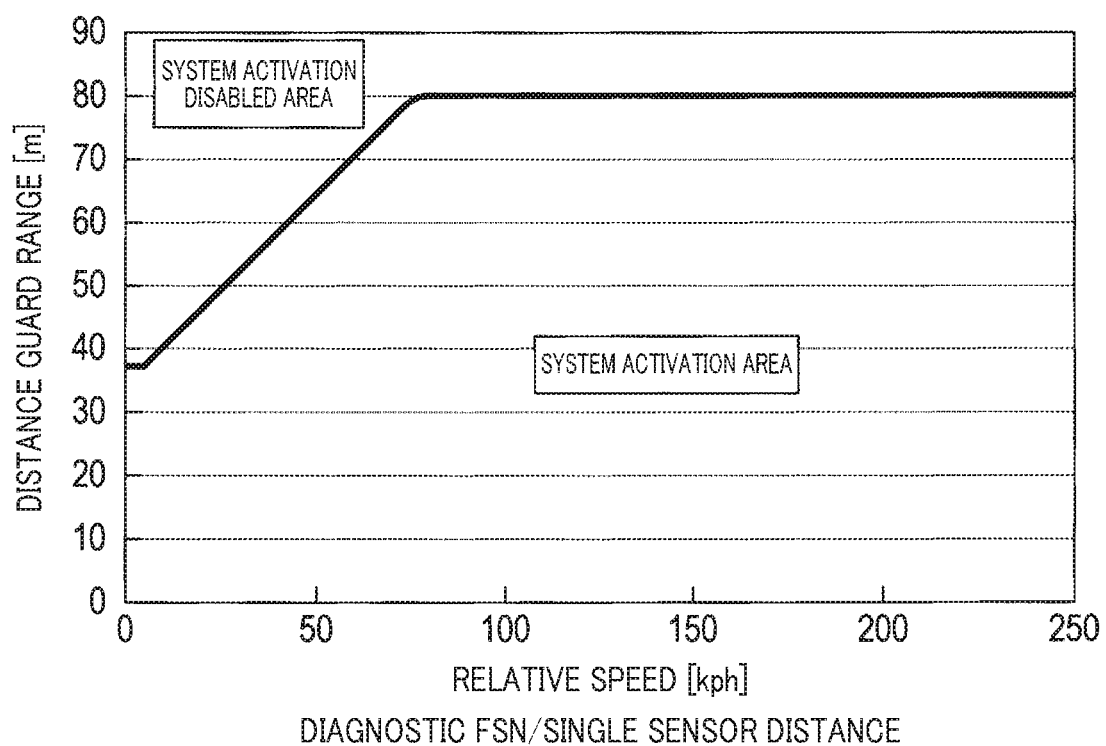
FIG. 5 is a diagram illustrating a determination process for each sensor signal in the activation determination operation and the activation determination diagnosis.

First, as shown in FIG. 5, a graph is prepared. In the graph, the speed (kph) of the own vehicle relative to the preceding vehicle is used as the horizontal axis and distance guard range (m) is used as the vertical axis. In the graph, range values are set based on the maximum activation distance (m) of the controlled object 16 and the upper limit value (sec) of the time to collision (TTC). For example, the maximum activation distance is set to 80 m and the upper limit value of the TTC is set to 2 sec. The maximum activation distance and the upper limit value of the TTC are reset depending on target performance. Then, a system activation region where the system such as the controlled object 16 should be activated is set on the lower right side than the range values in the graph. The rest of the region is set as a system activation disabled region where the system such as the controlled object 16 does not need to be activated. In this case, the system activation region for the activation determination diagnosis (diagnostic logic) is preferably set to be wider than the system activation region for the activation determination operation (mainstream logic) so as not to hinder the process for the activation determination operation (mainstream logic). FIG. 5 illustrates the system activation region and the system activation disabled region for the activation determination diagnosis (diagnostic logic) as an example. Further, an affirmative determination is made when the relationship between the FSN distance and the speed of the own vehicle relative to the preceding vehicle falls within the system activation region, and a negative determination is made when the same falls within the system activation disabled region.

(2) FSN Lateral Position:

The FSN lateral position means the lateral position of the preceding vehicle with respect to the own vehicle, which is calculated using both the result of radar recognition of the preceding vehicle obtained from the millimeter-wave target recognition processing unit 12 and the result of image recognition of the preceding vehicle obtained from the camera target recognition processing unit 11.

Figure 6:
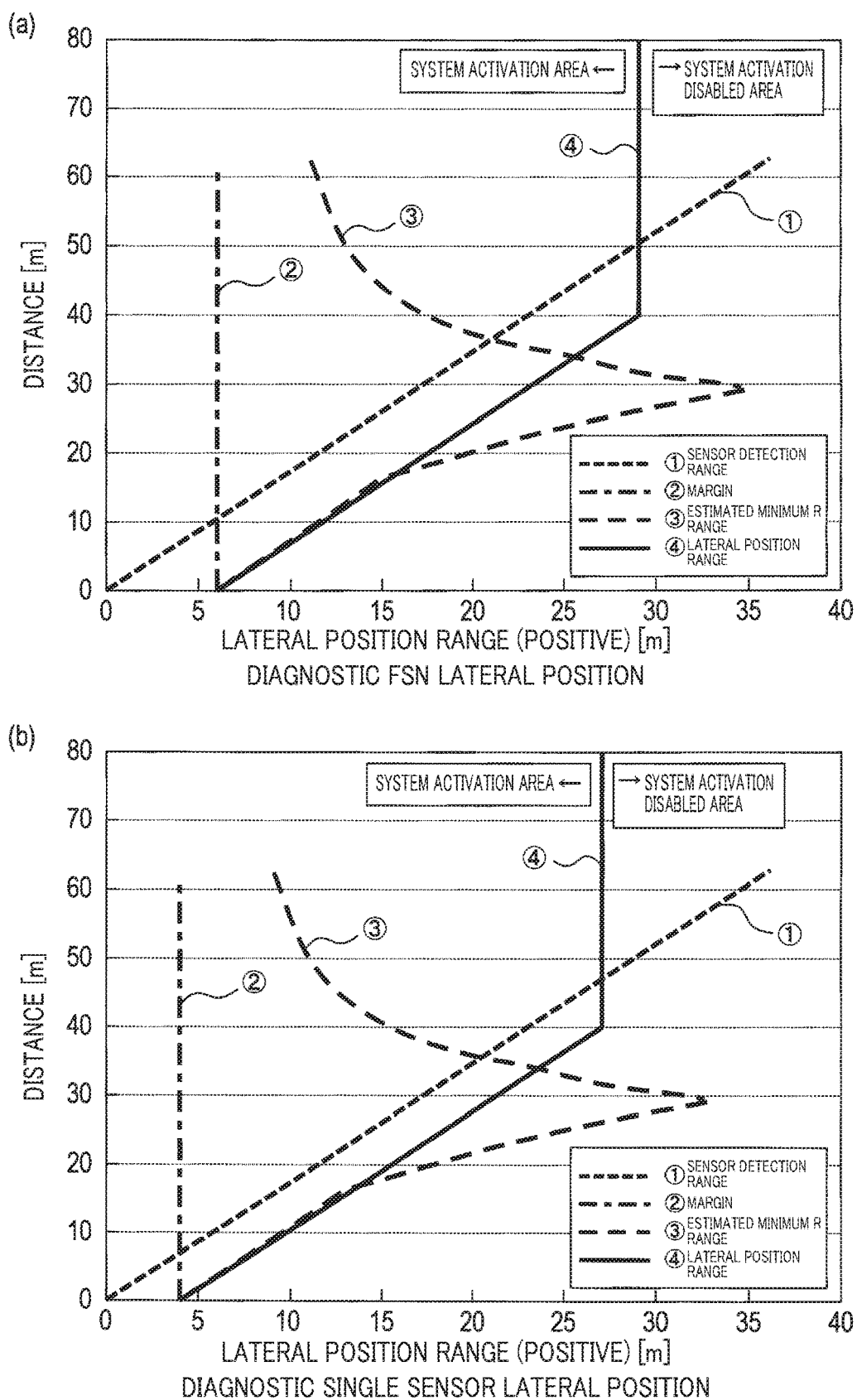
FIG. 6 is a diagram illustrating the determination process for each sensor signal in the activation determination operation and the activation determination diagnosis.

As shown in FIG. 6(*a*), a graph is prepared. In the graph, the h lateral position range (positive) (m) is used as the horizontal axis and the distance (m) is used as the vertical axis. The sensor detection range is plotted in the graph ((1) of FIG. 6). Then, the margin of the lateral position is set on the premise that the own vehicle moves straight ahead ((2) of FIG. 6). In the example illustrated in FIG. 6(*a*), this margin is set to be ±6 m. Further, at each vehicle speed, the value obtained by adding the foregoing margin to the lateral position necessary for detection of an object at the maximum distance set at the time of the foregoing distance setting is plotted in the graph with the minimum R under the Japanese Government Order on Road Design Standards ((3) of FIG. 6). In addition, the region where the detection range is greater than the lateral position (the region of 40 m or more in the drawing) is deleted as an unnecessary region ((4) of FIG. 6), and the remaining region is set as a system activation region where the system such as the controlled object 16 should be activated. The rest of the region is set as a system activation disabled region where the system such as the controlled object 16 does not need to be activated. In this case, the system activation region for the activation determination diagnosis (diagnostic logic) is preferably set to be wider than the system activation region for the activation determination operation (mainstream logic) so as not to hinder the process for the activation determination operation (mainstream logic). FIG. 6(*a*) illustrates the system activation region and the system activation disabled region for the activation determination diagnosis (diagnostic logic) as an example. Further, an affirmative determination is made when the relationship between the FSN lateral position and the straight-line distance from the own vehicle to the preceding vehicle falls within the system activation region, and a negative determination is made when the same falls within the system activation disabled region.

(3) Sensor Distance:

The sensor distance means the distance from the own vehicle to the preceding vehicle, which is calculated using either the result of radar recognition of the preceding vehicle by the millimeter-wave target recognition processing unit 12 or the result of image recognition of the preceding vehicle by the camera target recognition processing unit 11. In the activation determination operation (mainstream logic), the distance from the own vehicle to the preceding vehicle calculated using either the result of radar recognition of the preceding vehicle by the millimeter-wave target recognition processing unit 12 or the result of image recognition of the preceding vehicle by the camera target recognition processing unit 11 is used as sensor distance. In the activation determination diagnosis (diagnostic logic), the distance from the own vehicle to the preceding vehicle calculated using the result of radar recognition of the preceding vehicle by the millimeter-wave target recognition processing unit 12 is used as sensor distance.

As in the foregoing case of the FSN distance, as shown in FIG. 5, a graph is prepared. In the graph, the relative speed (kph) of the own vehicle to the preceding vehicle is used as the horizontal axis and the distance guard range (m) is used as the vertical axis. Next, range values are set in the graph based on the maximum activation distance (m) of the controlled object 16 and the upper limit value (sec) of the time to collision (TTC). For example, the maximum activation distance is set to be 80 m and the TTC upper limit value is set to be 2 sec. The maximum activation distance and the upper limit value of the TTC are reset depending on target performance. Then, the system activation region where the system such as the controlled object 16 is to be activated is set on the lower right side than the range values in the graph. The other region is set as system activation disabled region where the system such as the controlled object 16 is not to be activated. In this case, the system activation region for the activation determination diagnosis (diagnostic logic) is preferably set to be wider than the system activation region for the activation determination operation (mainstream logic) so as not to hinder the process for the activation determination operation (mainstream logic). FIG. 5 illustrates the system activation region and the system activation disabled region for the activation determination diagnosis (diagnostic logic) as an example. Further, an affirmative determination is made when the relationship between the sensor distance and the relative speed of the own vehicle to the preceding vehicle falls within the system activation region, and a negative determination is made when the same falls within the system activation disabled region.

(4) Sensor Lateral Position:

The sensor lateral position means the lateral position of the preceding vehicle with respect to the own vehicle, which is calculated using either the result of radar recognition of the preceding vehicle by the millimeter-wave target recognition processing unit 12 or the result of image recognition of the preceding vehicle by the camera target recognition processing unit 11. In the activation determination operation (mainstream logic), the lateral position of the preceding vehicle with respect to the own vehicle calculated using either the result of radar recognition of the preceding vehicle by the millimeter-wave target recognition processing unit 12 or the result of image recognition of the preceding vehicle by the camera target recognition processing unit 11 is used as sensor lateral position. In the activation determination diagnosis (diagnostic logic), the lateral position of the preceding vehicle with respect to the own vehicle calculated using the result of radar recognition of the preceding vehicle by the millimeter-wave target recognition processing unit 12 is used as sensor lateral position.

As exemplified in FIG. 6(*b*), a graph is prepared. In the graph, the lateral position range (positive) (m) is used as the horizontal axis and the distance (m) is used as the vertical axis. Next, the sensor detection range is plotted in the graph ((1) of FIG. 6). Then, the margin of the lateral position is set on the premise that the own vehicle moves straight ahead ((2) of FIG. 6. In the example illustrated in FIG. 6(*b*), this margin is set to be ±4 m. Further, at each vehicle speed, the value obtained by adding the foregoing margin to the lateral position necessary for detection of an object at the maximum distance set at the foregoing distance setting is plotted in the graph with the minimum R under Government Order on Road Design Standards ((3) of FIG. 6). In addition, the region where the detection range is greater than the lateral position (the region of 40 m or more of FIG. 6) is deleted as an unnecessary region ((4) of FIG. 6), and the remaining region is set as system activation region where the system such as the controlled object 16 is to be activated. The other region is set as system activation disabled region where the system such as the controlled object 16 is not to be activated. In this case, the system activation region for the activation determination diagnosis (diagnostic logic) is preferably set to be wider than the system activation region for the activation determination operation (mainstream logic) so as not to hinder the process for the activation determination operation (mainstream logic). FIG. 6(b) illustrates the system activation region and the system activation disabled region for the activation determination diagnosis (diagnostic logic) as an example. Further, an affirmative determination is made when the relationship between the sensor lateral position and the straight-line distance from the own vehicle to the preceding vehicle falls within the system activation region, and a negative determination is made when the same falls within the system activation disabled region.

3. Advantageous Effects of the Embodiment

Thus, the collision mitigation device 1 of the present embodiment improves the reliability of the activation determination whether to activate the controlled object 16 such as a brake. Consequently, it is possible to improve the system reliability of the collision mitigation device 1 that is installed in the own vehicle to mitigate a collision between the own vehicle and a preceding vehicle travelling ahead of the own vehicle by the activation of the controlled object 16.

REFERENCE SIGNS LIST

1 . . . Collision mitigation device
11 . . . Camera target recognition processing unit
12 . . . Millimeter-wave target recognition processing unit
13 . . . Vehicle state input unit
14 . . . FSN computation unit
15 . . . Pre-crash safety system (PCS)
15A . . . PCS diagnostic detection unit
15B . . . Activation determination operation unit
15C . . . Activation determination diagnosis unit
15D . . . Control processing unit
16 . . . Controlled object

The invention claimed is:
1. A collision mitigation device installed in an own vehicle to mitigate a collision between the own vehicle and a preceding vehicle travelling ahead of the own vehicle, based on activation of a controlled object, comprising:
a radar recognition unit that performs radar recognition of the preceding vehicle travelling ahead of the own vehicle, based on a result of emitting radar waves from a radar sensor to a forward direction of the own vehicle and receiving, by the radar sensor, reflection waves that are the emitted radar waves reflected by a target;
an image recognition unit that performs image recognition of the preceding vehicle travelling ahead of the own vehicle, based on an image of an area ahead of the own vehicle captured by an image sensor;
a position calculation unit that calculates a position of the preceding vehicle based on a result of radar recognition of the preceding vehicle performed by the radar recognition unit and a result of image recognition of the preceding vehicle performed by the image recognition;
a state detection unit that detects a vehicle state of the own vehicle;
a signal detection unit that detects an abnormality occurrence signal indicating an occurrence of an abnormality in the collision mitigation device;
an activation determination operation unit that determines whether to activate the controlled object, based on a result of the calculation obtained from the position calculation unit and the vehicle state of the own vehicle detected by the state detection unit when the signal detection unit detects no abnormality occurrence signal;
an activation determination diagnosis unit that determines whether the activation determination operation unit has properly performed an activation determination; and
a control processing unit that permits controlling of the controlled object based on the activation determination when the activation determination diagnosis unit determines that the activation determination operation unit has properly performed the activation determination, and does not permit controlling of the control target based on the activation determination when the activation determination diagnosis unit determines that the activation determination operation unit has not properly performed the activation determination, wherein
in any one of the following cases (A) to (D), the activation determining diagnosis unit determines that the activation determination operation unit has not properly performed the activation determination:
(A) the activation determining operation unit has not performed the activation determination;
(B) the vehicle state of the own vehicle detected by the state detection unit does not satisfy a determination criterion set from a viewpoint of mitigating a collision between the own vehicle and the preceding vehicle, based on the activation of the controlled object;
(C) the signal detection unit detects the abnormality occurrence signal; and
(D) the position of the preceding vehicle calculated by the position calculation unit does not satisfy a determination criterion set from a viewpoint of mitigating a collision between the own vehicle and the preceding vehicle, based on the activation of the controlled object.

2. The collision mitigation device according to claim 1, wherein the vehicle state of the own vehicle includes a travelling speed of the own vehicle.

3. The collision mitigation device according to claim 1, wherein the vehicle state of the own vehicle includes a curvature radius of travel curve of the own vehicle.

4. The collision mitigation device according to claim 1, wherein the position of the preceding vehicle calculated by the position calculation unit includes a distance from the own vehicle to the preceding vehicle calculated using both the result of radar recognition of the preceding vehicle obtained from the radar recognition unit and the result of image recognition of the preceding vehicle obtained from the image recognition unit.

5. The collision mitigation device according to claim 1, wherein the position of the preceding vehicle calculated by the position calculation unit includes a lateral position of the preceding vehicle with respect to the own vehicle calculated using both the result of radar recognition of the preceding vehicle obtained from the radar recognition unit and the result of image recognition of the preceding vehicle obtained from the image recognition unit.

6. The collision mitigation device according to claim 1, wherein the position of the preceding vehicle calculated by the position calculation unit includes a distance from the own vehicle to the preceding vehicle calculated using either one of the result of radar recognition of the preceding vehicle obtained from the radar recognition unit and the result of image recognition of the preceding vehicle obtained from the image recognition unit.

7. The collision mitigation device according to claim 1, wherein the position of the preceding vehicle calculated by the position calculation unit includes a lateral position of the preceding vehicle with respect to the own vehicle calculated using either one of the result of radar recognition of the preceding vehicle obtained from the radar recognition unit and the result of image recognition of the preceding vehicle obtained from the image recognition unit.

* * * * *